Nov. 25, 1958  H. E. NELSON  2,861,662
ELECTRIC MOTOR POWER TAKE OFF
Filed Sept. 19, 1955  4 Sheets-Sheet 1
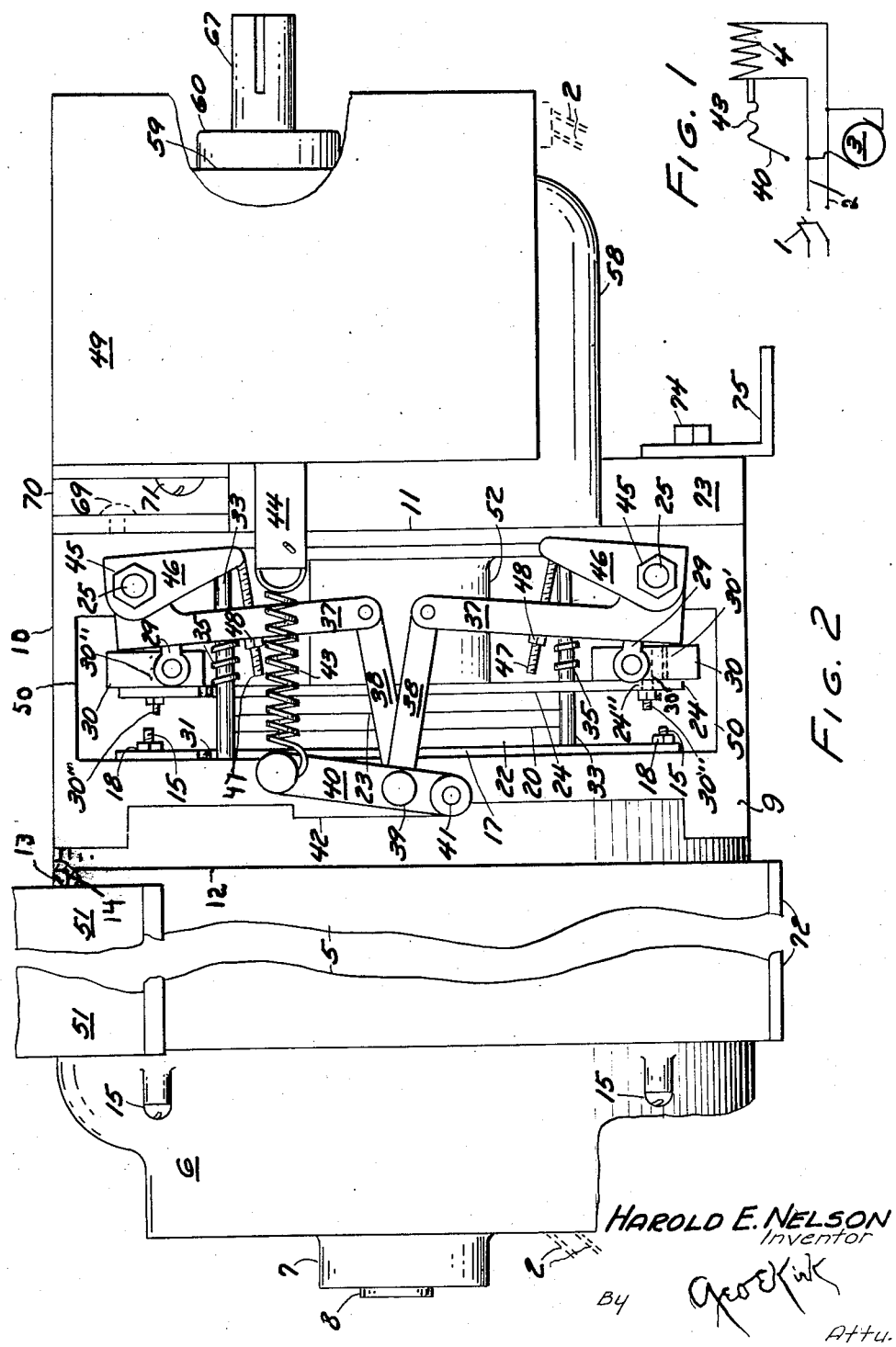
HAROLD E. NELSON
Inventor
BY
Atty.

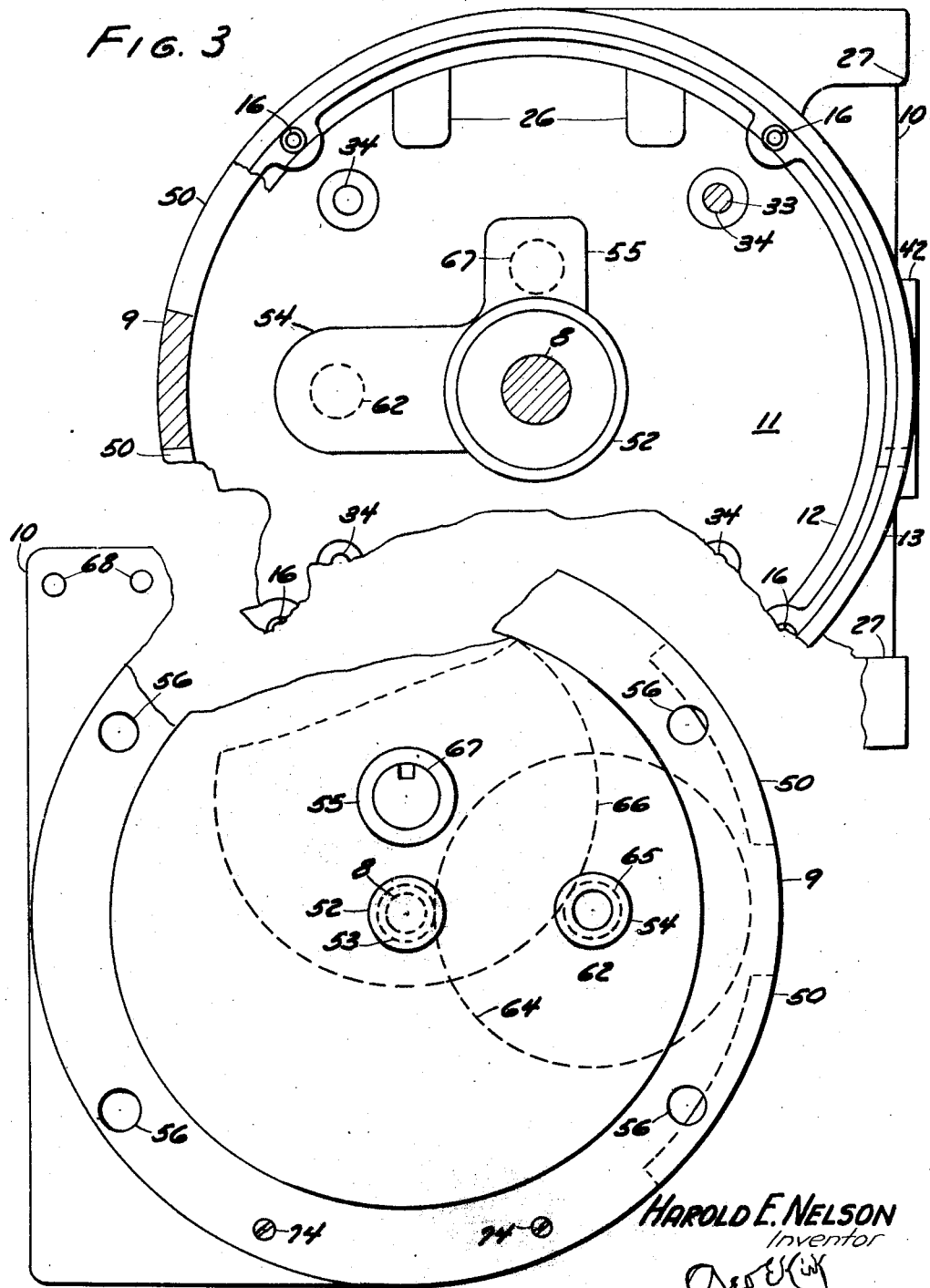

Nov. 25, 1958     H. E. NELSON     2,861,662
ELECTRIC MOTOR POWER TAKE OFF

Filed Sept. 19, 1955     4 Sheets-Sheet 3

HAROLD E. NELSON
Inventor

By

Atty.

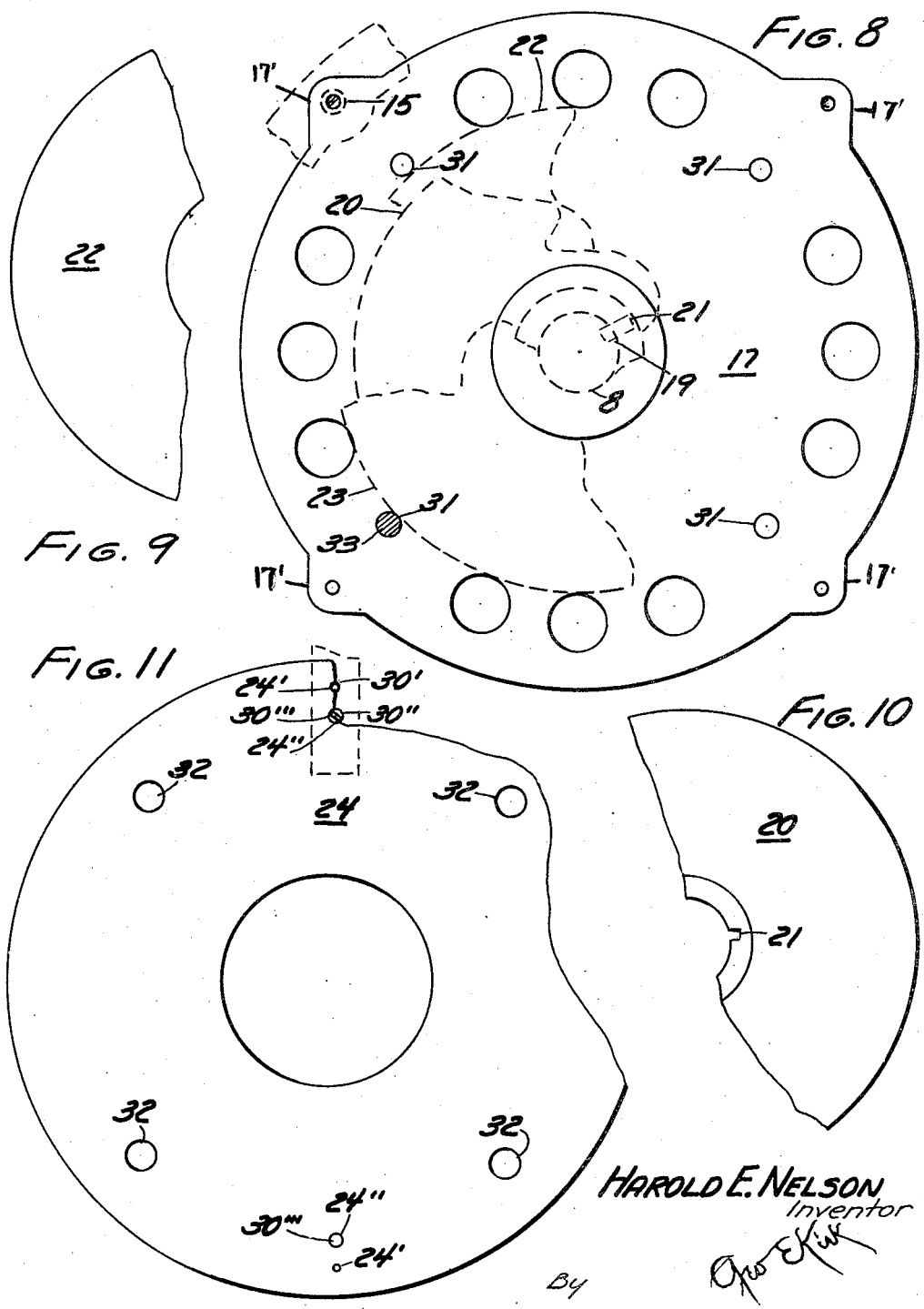

2,861,662
ELECTRIC MOTOR POWER TAKE OFF

Harold E. Nelson, Toledo, Ohio

Application September 19, 1955, Serial No. 534,955

7 Claims. (Cl. 192—2)

This invention relates to compact motor drive structures having a special assembly between driving and driven shafts, with accessible adjustments to compensate for any wearing which may occur in said structures.

This invention has utility when incorporated in housing sections, coaxially from a motor, which have a brake to hold the motor shaft when it is not in operation and a gear train to be driven therefrom.

Referring to the drawings:

Fig. 1 is a wiring diagram of a control circuit for the motor-brake-gearing structure;

Fig. 2 is a side elevation of the structure with portions broken away;

Fig. 3 is a fragmentary side elevation of the brake-enveloping housing section, looking away from the motor;

Fig. 4 is a partial elevation looking at the opposite end of the housing from the showing in Fig. 3;

Fig. 8 is a side elevation of the friction brake anchored disk;

Fig. 9 is a fragmentary side elevation of a friction disk from the brake assembly;

Fig. 10 is a partial side elevation of the shaft carried disk of the friction brake assembly; and Fig. 11 is an incomplete side elevation of the axially shiftable disk in the brake assembly remote from the disk of Fig. 8.

Figure 5:
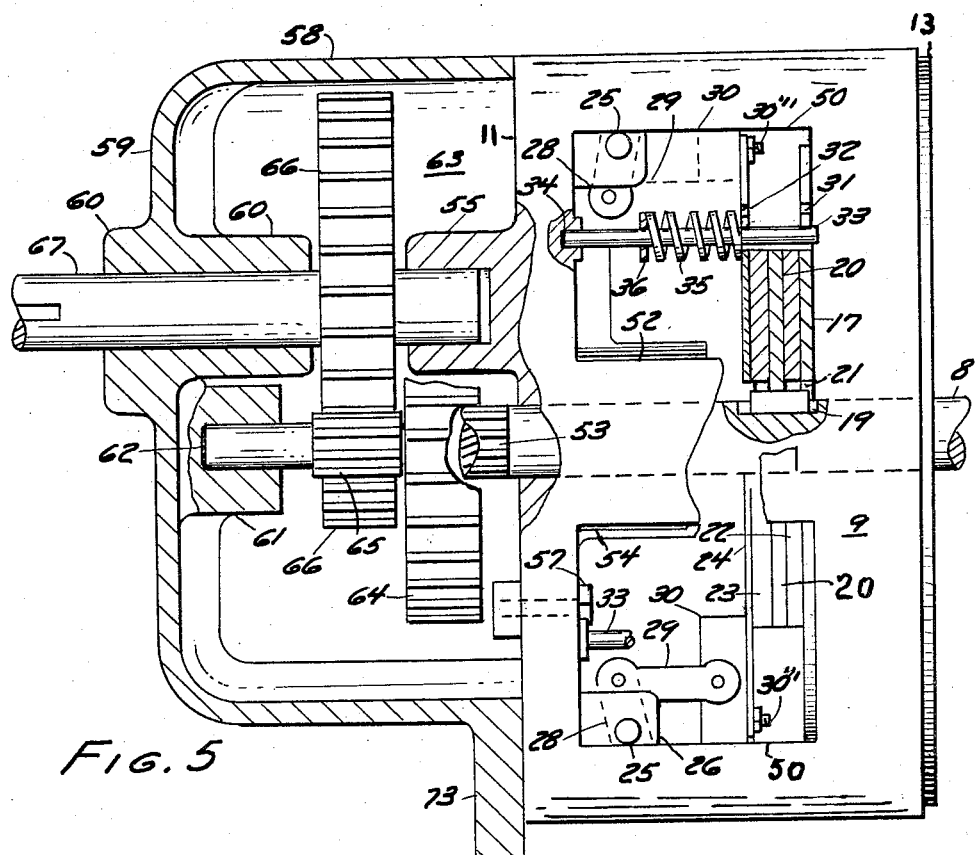
Fig. 5 is a view of the brake section of the housing opposite side from that of Fig. 2, with portions being shown in section.
Figure 6:
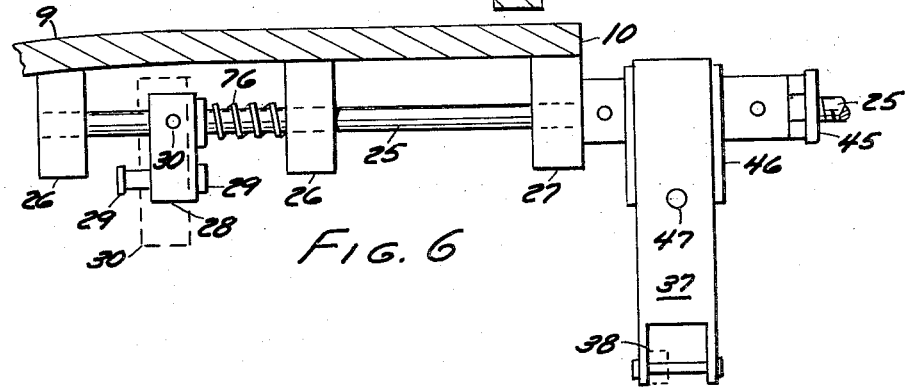
Fig. 6 is a fragmentary detail of the upper rock shaft in the mechanism to release the brake.
Figure 7:
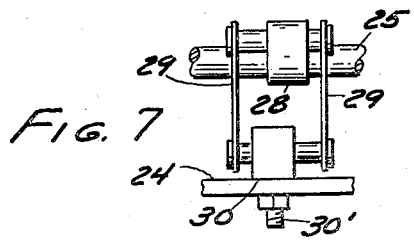
Fig. 7 is a plan view of linkage from the rock shaft to the shiftable brake disk.

A switch 1 may be used to cut in an electric power supply by the conductors lines 2 to a motor 3 and simultaneously energize solenoid coil 4 (Fig. 1). The motor 3 has a central drum or housing 5 for its field windings, and mounted on one end of said housing 5 (Fig. 2) is a disk 6 which provides a bearing 7 for an armature shaft 8.

Under the invention herein, there is not a duplication of the motor housing end disk 6 at the opposite end of the motor, but in lieu thereof there is provided a primary housing section merging from semicylindrical form 9 to a full diameter tangential open face 10 (Figs. 3, 4). The housing 9, 10, has an end wall 11, and remote therefrom, or at its other end toward the motor 3, may be a ring 12. The ring 12 has an endless seat 13 adapted to be assembled in register with a complementary seat 14 (Fig. 2) of the housing 5 for the motor field windings. This assembly may be accomplished by the four bolts 15 which extend through peripheral regions of the disk 6 and then on through the housing 5 parallel to the shaft 8, and thence to openings 16 (Figs. 2, 3) in the ring 12, there to extend through the ear portion 17′ on the disk 17 (Fig. 8) and thereafter to be engaged by nuts 18. The disk 17 has a central opening clear of the shaft 8 and through which the shaft extends. This disk 17 is an element of a friction brake, and by the set of four bolts 15, is assembled in anchored alignment with the disk 6, central housing 5, and the primary housing section 9, 10.

The brake

The armature shaft 8, protruding through the ring 12, clear of the plate 17, has a key or spline 19 (Fig. 5) to hold a medial brake disk member 20 by coacting with keyway 21 in the member 20, so that the member 20 may be free for some movement axially of the shaft 8, but held to rotate therewith.

On the side of one member 20 toward the plate 17 is a friction disk 22. On the opposite side of the member 20 is a similar fiber, asbestos, or other type of a friction disk 23. The multi-disk brake is completed by a plate or disk 24, which is clear of the shaft 8 as are the disks 22, 23, and the plate 17, and in which assembly the disk 20 is centrally located (Figs. 5, 8, 9, 10, 11).

The brake adjustment

Extending in parallel to protrude from the housing section portion 10 are rock shafts 25 (Figs. 2, 5, 6, 7) in the bearings 26, 27. These shafts 25, which are positioned below the shaft 8, are on the same diameter and equally spaced from the shaft 8. Each shaft 25 has fixed therewith between the bearings 26, an arm 28 directed toward the shaft 8 and at its free end provided with a link 29, generally horizontally extending to mount rockably relatively there to a block 30.

The disk or plate 24 (Fig. 11) near its periphery on a diameter may have a pair of openings 24′ which are adapted to receive the point of a tool thrust through a hole 30′ in the block 30 for alignment purposes. Inwardly therefrom, hole 24″ in the plate 24 is thus brought in register with a hole 30″ in the block 30. A bolt 30‴ is thrust through the holes 24″, 30″, and there anchored thus completing the linkage or transmission from the rock shafts 25 by providing diametrically balanced actuating means or connections to the friction brake disk 24. These connections are operable to effect shifting of the plate 24 axially of the shaft 8. The links 29 between the arms 28 and the blocks 30 have their pivot bearing end portions of sufficient length to allow for some end play whereby there is avoided binding action at this disk brake operating connection mechanism.

Anchored against rotation relatively to the housing 9, 10, but with some freedom for the plate 24 to move axially of the shaft 8, are the parallel plates 17, 24, which have four openings 31 (Fig. 8) in the plate 17 aligned with four openings 32 (Fig. 11) in the plate 24. Pins 33 (Figs. 2, 5) extend through these openings 31, 32, to enter seats 34 (Figs. 3, 5) in the housing section end wall or disk 11. On each pin 33, between the wall 11 and plate 24, is a compression helical spring 35, to hold the pin 33 against the wall 11. A collar or ring 36 is snapped into seat-holding engagement with its pin 33, and the plate 24, to hold the pin 33 into its seat 34 in the wall 11, as well as the plate 24 to pinch the disks 20, 22 and 23 of the brake to compress the spring 35. These pins 33 thus provide yieldable means coacting normally for urging the multi-disk friction brake to lock the shaft 8 from rotation relatively to the housing section 9, 10.

Outward from the open side 10 of the housing section 9, 10 (Figs. 2, 6), on each shaft 25, is a loose arm 37. Said arms 37 have their free ends extending toward each other and respectively there have horizontally extending links 38 provided with a common pivotal connection 39 to an upwardly directed second class lever arm 40 having a fulcrum bearing 41 from plate seat portion 42 of the ring 12. At the upper free end of the lever 40 is a tension helical spring 43 normally pulling to inactive position a solenoid core 44 from its coil 4.

Lock nuts 45 may anchor relatively shorter arms 46, rather than the arms 37, so that they will be held fast with the shafts 25. In each arm 37 is an adjusting screw 47 extending therethrough to abut against an arm 46, and, as adjusted, to be held locked by a nut 48. There is thus adjusted a fixed angular relation for pull limit of the solenoid coil 4 in the housing 49.

Away from its open face 10, there are windows or openings 50 in the arc portion 9 for ventilation as well as access to the nuts 18 on the bolts 15 for the housing section 9, 10, to be assembled with the motor housing 5. The windows 50 and the open face 10 expose the brake structure for such upkeep or other attention as may be required.

By locating the solenoid 49 and the connecting linkage therefrom outward from the side 10, such are accessible for adjustment, such as taking up wear from the disks 22, 23, developing during motor use. This may be cared for by resetting of the bolts 47, as well as by relocating the arms 46 relative to the shafts 25.

Supplemental controls for the motor may be in an accessory housing 51 (Fig. 2) which is shown as mounted on the housing 5.

The gearing

Complementary to the end bearing 7 for one end of the armature shaft 8 is a bearing 52 (Figs. 3, 4, 5) for the remote end portion of this shaft and said bearing is located in the housing wall 11. On the shaft 8 as protruding through the bearing 52 in the wall 11 and fixed thereon is a pinion 53. Toward the arc face 9 from the bearing 52, the wall 11 has a bearing 54 open away from the ring 12. Additionally in this same direction from the wall 11 and upward from the bearing 52 projects a boss-providing bearing 55.

Somewhat offset or out of axial alignment with the bolt hole openings 16 in the ring 12 of the primary housing section 9, 10, the wall 11 has bolt holes 56 through which extend bolts 57 to engage in the rim portion of a secondary or gear housing section 58 with an end wall 59 thus located away from the wall 11.

The wall 59 has a two-way projecting boss for a bearing 60 with which is aligned the bearing 55. A second bearing 61 in the wall 59 is aligned with the bearing 54 in the wall 11. The bearings 54, 55, 61, are open only into chamber 63 of the secondary housing section 58.

The aligned bearings 54, 61, mount a countershaft 62, which is thus, by the wall 11, wholly encased in the chamber 63. Adjacent the wall 11 on this shaft 62 is a gear 64 in mesh with the pinion 53 fixed on the shaft 8. Fixed with the gear 64 and adjacent thereto on the shaft 62 is a pinion 65 in mesh with a gear 66 fixed on power take-off shaft 67 extending from the bearing 55 in the wall 11 and through the bearing 60 in this gear train housing end wall 59 to protrude, there to have power-in-use connection for the desired operations.

Bolt holes 68 (Fig. 4 upper left) near the side 10 of the primary housing 9, 10, provide location for bolts 69 (Fig. 2) to position an angle bracket 70 through which bolts 71 extend to mount the housing 49 for the solenoid.

Normal foot portions 72 for the motor housing 5 locate a plane below the disk brake housing section 9, 10. In order to provide stabilizing support for the unit as to the overhang away from the motor proper, the housing 58 at its lower region adjacent the wall 11 has a depending flange 73 engaged by bolts 74 for an angle bracket foot piece 75 positioned coplanar with the foot portions 72.

Upon throwing in of the switch 1 to start the motor 3, the solenoid 4 is energized, incidental as to such supplemental or other controls as may be in the housing 51 or otherwise incorporated for the unit structure. The energized coil 3 of the solenoid overcomes the spring 43 to pull the disk 24 into brake releasing position. Springs 76 on the shafts 25 (Fig. 6) allow end play for these shafts to avoid binding each way therefrom, notwithstanding lateral floating permitted for the links 29, 38.

What is claimed and it is desired to secure by Letters Patent is:

1. A motor shaft, a housing section providing a bearing for the shaft, a friction disk brake device in the section and about the shaft, said device embodying a first disc anchored with the section, a second disc, pins fixed with the section upon which the second disc is shiftable axially of the shaft and is held against angular movement relative to the section, spring means yieldably urging the second disc toward the first disc, and diametrically balanced actuator means including exteriorly accessible adjustable linkage for shifting the second disc away from the first disc.

2. The device of claim 1 wherein said actuator means includes two parallel rock shafts.

3. A motor shaft, a housing section providing a bearing for the shaft, a friction disc brake device in the section and about the shaft, said device embodying a central disc rotatable with the shaft, a first disc anchored with said section on one side of said central disc, a second disc on the other side of said central disc, means fixed with said section upon which said second disc is shiftable axially of the shaft and is held against angular movement relative to said section, floating frictional disc means on both sides of said central disc engageable by the adjacent sides of said first and second discs, resilient means for urging said second disc toward said first disc to clamp said frictional disc means and said center disc between said first and second discs to brake the rotation of said shaft, and actuator means for shifting said second disc away from said first disc against the action of said resilient means, said actuator means including adjustable linkage exterior of said section.

4. A motor shaft, a housing section providing a bearing for said shaft, a friction disc brake device in said section and about said shaft, said device embodying: a disc, means fixed with said section upon which said disc is shiftable axially of said shaft and held against angular movement relative to said section, two parallel rock shafts on opposite sides of said motor shaft and adjacent said disc, said rock shafts extending outside said section, two crank means anchored to each of said rock shafts, one inside and the other outside said section, means for connecting said inner crank means to said disc for shifting said disc, an actuator means connected to said outer crank means for operating said brake device, and adjustable means connected between said outer crank means and said actuator for equalizing the action of said actuator on both said inner crank means.

5. A motor, a motor shaft, a first housing section into which one end of said shaft extends, a take-off shaft and a gear train in said first housing section between said shafts and including a counter shaft, a brake on said end of said motor shaft outside said first housing section, a second housing section for said brake, said two housing sections fully enclosing said end of said motor shaft and being separated by a wall, said wall providing three axially parallel bearings, one for each shaft, and the outer wall of said first housing section providing two bearings, one for the counter shaft and the other for the take-off shaft.

6. In a motor having a shaft, a friction brake and a gear box mounted on said shaft, said brake and said gear box comprising a unit assembly having a housing and an inner wall separating said gear box from said brake, a straddle bearing in said wall for said shaft of said motor, said shaft mounting a gear in said gear box on one side of said wall and said brake on said shaft on the other side of said wall, said gear box having a counter shaft and a take-off shaft both separate from said motor shaft, and separate bearing means for all three of said shafts mounted in said inner wall.

7. In a motor having a shaft, a friction brake and a gear box mounted on said shaft, said brake and said gear box comprising a unit assembly having a housing and an inner wall separating said gear box from said brake, a straddle bearing in said wall for said shaft of said motor, said shaft mounting a gear in said gear box on one side of said wall and said brake on said shaft on the other side of said wall, means for operating said brake, and means for adjusting the friction pressure of said brake exteriorly of said housing to compensate for the wear of the brake.

References Cited in the file of this patent

UNITED STATES PATENTS

| | | |
|---|---|---|
| 2,027,149 | Christian | Jan. 7, 1936 |
| 2,273,626 | Connell | Feb. 17, 1942 |
| 2,441,505 | Ochtman | May 11, 1948 |
| 2,606,455 | Thorens | Aug. 12, 1952 |
| 2,628,321 | Anderson | Feb. 10, 1953 |